UNITED STATES PATENT OFFICE.

JACOB URBAN, OF RACINE, WISCONSIN.

COLOR.

SPECIFICATION forming part of Letters Patent No. 277,633, dated May 15, 1883.

Application filed February 21, 1883. (No specimens.)

*To all whom it may concern:*

Be it known that I, JACOB URBAN, of Racine, in the county of Racine, and in the State of Wisconsin, have invented certain new and useful Improvements in Colors; and I do hereby declare that the following is a full, clear, and exact description thereof.

My invention consists in a composition for coloring wood and like substances, the nature of which will be fully set forth hereinafter.

The body of my improved color is an earth found in and around Cassel in Hessau, called "Cassel earth;" and to make my composition I first clean the earth by washing and then place it in an oven in pans or trays, where it is subjected to a high degree of heat until it ignites. I then remove it and pour enough of a solution of caustic potash over it to completely saturate it, after which the saturated earth is allowed to cool and dry, and when cool and dry is ready for the market. It is sold to the trade in a dry state, but when it is to be used must be mixed with water.

My improved color is applied with a brush.

I am aware that Cassel earth has before been made into a pigment by roasting, and that its coloring properties have long been well-known; but I find that by combining a solution of caustic potash with it I give it a gloss that greatly enhances its value and enables me to make a very clever imitation of polished black walnut on any kind of soft wood.

What I claim is—

A paint or stain composed of Cassel earth partly roasted and intermixed with caustic potash, as and for the purpose set forth.

In testimony that I claim the foregoing I have hereunto set my hand, this 29th day of January, 1883, in the presence of two witnesses.

JACOB URBAN.

Witnesses:
S. S. STOUT,
ADOLPH E. KLEIN.